United States Patent

Manabe

[11] Patent Number: 5,859,666
[45] Date of Patent: Jan. 12, 1999

[54] DIGITAL STILL VIDEO CAMERA

[75] Inventor: Katsuhiko Manabe, Osaka, Japan

[73] Assignee: Ricoh Company, Ltd., Tokyo, Japan

[21] Appl. No.: 665,901

[22] Filed: Jun. 19, 1996

[30] Foreign Application Priority Data

Jul. 25, 1995 [JP] Japan .................................. 7-188943

[51] Int. Cl.⁶ .................................................. H04N 5/76
[52] U.S. Cl. .......................................................... 348/231
[58] Field of Search .................................... 348/231, 233, 348/552; 386/52; 358/909.1, 906; H04N 5/76

[56] References Cited

FOREIGN PATENT DOCUMENTS 7-154734  6/1995  Japan ............................ H04N 5/907

*Primary Examiner*—Wendy Garber
*Assistant Examiner*—Tuan V. Ho
*Attorney, Agent, or Firm*—Oblon, Spivak, McClelland, Maier & Neustadt, P.C.

[57] ABSTRACT

A digital still video camera including a camera processor which processes image data of a subject, a recording processor which generates recording data based on the processed image data, a recording controller which controls recording of the recording data to a recording medium, a memory which stores image data processed by the camera processor and recording data recorded in the recording medium, a control device which controls the camera processor, the recording processor, and the recording controller, and an evacuating/writing device which interrupts control by the control device and evacuates/writes the recorded recording data between the recording medium and the memory.

10 Claims, 3 Drawing Sheets

– 5,859,666 –

DIGITAL STILL VIDEO CAMERA

BACKGROUND OF THE INVENTION

1. Field of the Invention

This invention generally relates to a digital still video camera, and more particularly relates to a digital still video camera for recording image data of a subject to a recording medium, for example, a flash memory card.

2. Discussion of the Background

FIG. 3 is a block diagram of a conventional digital still video camera including a video processing unit formed by a lens 1, a CCD (Charge Coupled Device) 2, a pre-processing circuit 3, an A/D (Analog/Digital) converter 4, a memory 5, and a camera processor 6 and having video signal output 19.

The conventional camera of FIG. 3 further includes an encoder/decoder 7, a FIFO (First in First Out) circuit 8, a MCC (Memory Card Controller) 9 and a flash memory card 10. The FIFO circuit 8 is connected to MCC 9 and inputs data to and from the MCC 9. The flash memory card 10 is detachably connected to MCC 9, and memorizes recording data controlled by the MCC 9. A CPU 11 controls the camera processor 6, the encoder/decoder 7, and the MCC 9 (including FIFO circuit 8) using the bus 18.

Audio is input via a microphone 21, a first AMP (first amplifier) 12 which amplifies voice data input by the microphone, an A/D (Analog/Digital converter) 13 connected to the first AMP 12, an ADPCM (Adaptive Differential Pulse Code Modulator) 14 connected to A/D 13 and the MCC 9, a D/A (Digital/Analog) converter 15 connected to the ADPCM 14, a second AMP (second amplifier) 16 connected to the D/A 15, and output to an audio output 20 connected to second AMP 16.

A subject is image-formatted on the CCD 2 through the lens 1. The image formatted by CCD 2 is processed (for example gain control) in the pre-processing circuit 3, and converted to digital image data in the A/D converter 4. In the camera processor 6, the digital image data are processed in a matrix process and a raster block (8×8) process. In the encoder/decoder 7, the processed digital image data are encoded. The memory is used as an image memory in producing a brightness signal or a color signal and processing a matrix based on the digital image data input from the A/D converter 4, or is used as a memory for the raster block process in encoding or decoding. The encoded digital image data are input to the FIFO circuit 8 and recorded in the flash memory card 10 by MCC 9 as recorded image data.

A voice input signal is converted to an electrical signal by the microphone 21. In the first AMP 12, the electrical signal is amplified. In the A/D converter 13, the amplified electrical signal is converted to digital voice data, and in the ADPCM 14, converted digital voice data are encoded. The encoded digital voice data are recorded in the flash memory card 10 by MCC 9 as recorded voice data.

In case of reproducing recorded image data, the recorded image data are input to the FIFO circuit 8 by MCC 9 and decoded in the encoder/decoder 7. The decoded recorded image data are input and converted to a video signal in the camera processor 6, and output through the video signal output 19.

In case of reproducing the recorded voice data, the recorded voice data are input and decoded in the ADPCM 14. The decoded recorded voice data are input and converted to an analogue audio signal in the D/A converter 15, and output through the audio output 20.

However, in such a digital still video camera of the prior art, the flash memory card 10 has difficulty to rewrite data by 1 byte because an erasing unit of the flash memory card 10 is larger than 1 byte. The digital still video camera of prior art needs an optional memory which has larger capacity than the capacity of the erasing unit of the flash memory card 10. The necessity for the optional memory increases the size and cost of the conventional digital still video camera.

SUMMARY OF THE INVENTION

It is therefore an object of the present invention to provide an information processing apparatus with an operation panel in which the above-mentioned disadvantages are eliminated.

According to one aspect on the invention, there is provided a digital still video camera including a camera processor which processes image data of a subject, a recording processor which generates recording data based on the processed image data, a recording controller which controls recording of the recording data to a recording medium, a memory which stores image data processed by the camera processor and recording data recorded in the recording medium, a control device which controls the camera processor, the recording processor, and the recording controller, and an evacuating/writing means which interrupts control by the control device and evacuates/writes the recorded data between the recording medium and the memory.

As a further aspect of the invention, the recording controller reads other recorded data from the recording medium.

As a further aspect of the invention, the recording processor generates reproducing data based on the recording data read by the recording controller.

As a further aspect of the invention, the camera processor processes the reproducing data generated by the recording processor.

As a further aspect of the invention, the evacuating/writing means evacuates/writes file managing data in the recording medium.

As a further aspect of the invention, the controlling device controls rewriting of recorded data to the memory after writing of recording data to the memory by the evacuating/writing means.

As a further aspect of the invention, the control device controls memory addressing when rewriting recorded data to the memory.

As a further aspect of the invention, the evacuating/writing means increments the memory address at every memory access when the recorded data are written to the memory.

As a further aspect of the invention, the evacuating/writing means evacuates/writes the recorded data between the recording medium and the memory by direct memory accessing.

According to a further aspect of the present invention, there is provided a digital still video camera including a camera processor which processes image data of a subject, a recording processor which generates recording data based on the processed image data, a memory which stores image data processed by the camera processor and recording data recorded in the recording medium, a control device which controls the camera processor and the recording processor, and a recording controller which controls recording of the recording data to a recording medium, interrupts control by the control device, and evacuates/writes the recorded recording data between the recording medium and the memory.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
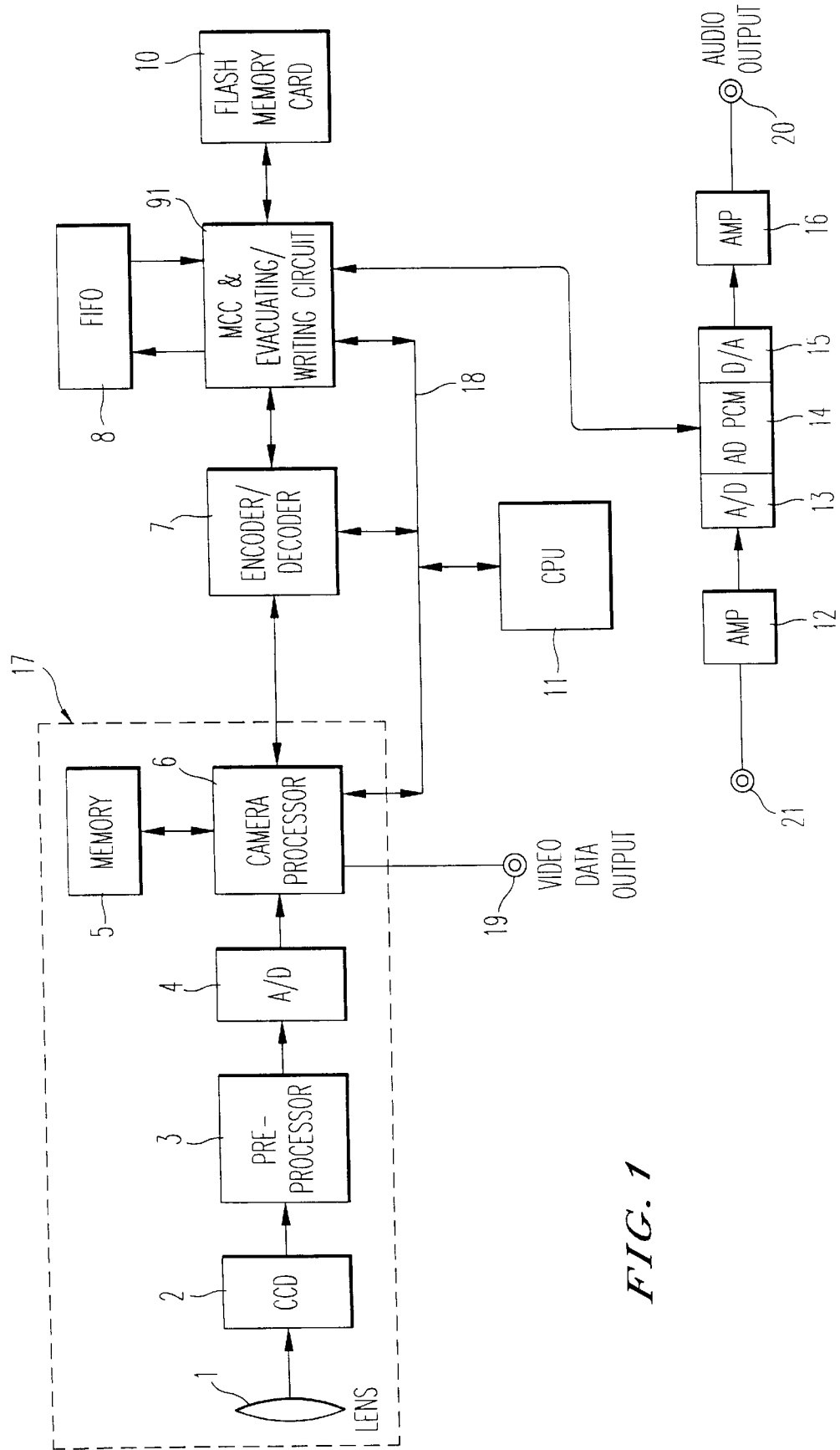
FIG. 1 is a block diagram of a digital still video camera of a first embodiment of the present invention.

Referring now to the drawings, wherein like reference numerals designate identical or corresponding parts throughout the several views, a first embodiment of the invention will be described in detail with reference to FIG. 1. In FIG. 1, video processing unit 17 includes a lens 1, a CCD (Charge Coupled Device) 2, a pre-processing circuit 3, an A/D (Analog/Digital) converter 4, a memory 5, a camera processor 6, and a video signal output 19. An encoder/decoder 7 connects the camera processor 6 to a MCC (Memory Card Controller) & evacuating/writing circuit 91, which is connected to a flash memory card 10. A FIFO circuit 8 is connected to MCC & evacuating/writing circuit 91 and inputs data to and from the MCC & evacuating/writing circuit 91. The flash memory card 10 is detachably connected to the MCC & evacuating/writing circuit 91, and stores recording data controlled by the MCC & evacuating/writing circuit 91. A CPU 11 controls the camera processor 6, the encoder/decoder 7, and the MCC & evacuating/writing circuit 91 (including FIFO circuit 8) using the bus 18.

Audio is input by a microphone 21, amplified by a first AMP (first amplifier) 12, and connected to digital voice data by an A/D (Analog/Digital converter) 13. An ADPCM (Adaptive Differential Pulse Code Modulator) 14 performs pulse code modulation on the digital voice data to produce encoded data which are converted to analog form by a D/A (Digital/Analog converter) 15. The output of D/A 15 is amplified by a second AMP (second amplifier) 10 and produced at an audio output 20.

The MCC & evacuating/writing circuit 91 records encoded digital image/voice data which are encoded by the encoder/decoder 7 or the ADPCM 14 to the flash memory card 10, and reads recorded image/voice data from the flash memory card 10. The MCC & evacuating/writing circuit 91 releases the CPU 11's occupation of the bus 18 to interrupt the CPU 11 to control the camera processor 6, the encoder/decoder 7, and the MCC & evacuating/writing circuit 91.

A subject is image-formatted on the CCD 2 through the lens 1. The image formatted by CCD 2 is processed (for example, gain control) in the pre-processing circuit 3, and converted to digital image data in the A/D converter 4. In the camera processor 6, the digital image data are processed by a matrix process and a raster block (8×8) process, and in the encoder/decoder 7, the processed digital image data are encoded. The memory 5 connected to the camera processor 6 is used as an image memory in producing a brightness signal or a color signal and processing a data matrix based on the digital image data input from the A/D converter 4, or is used as a memory for the raster block process in encoding or decoding. The encoded digital image data are input to the FIFO circuit 8, and recorded in the flash memory card 10 by the MCC & evacuating/writing circuit 91 as recording image data.

A voice signal is converted to an electrical signal by the microphone 21. In the first AMP 12, the electrical signal is amplified, in the A/D converter 13, the amplified electrical signal is converted to digital voice data, and in the ADPCM 14, converted digital voice data are encoded. The encoded digital voice data are recorded in the flash memory card 10 by the MCC & evacuating/writing circuit 91 as recording voice data.

In case of reproducing the recorded image data, the recorded image data are input to the FIFO circuit 8 by the MCC & evacuating/writing circuit 91 and decoded in the encoder/decoder 7. The decoded recording image data are input and converted to a video signal in the camera processor 6, and output through the video signal output 19.

In case of reproducing the recorded voice data, the recording voice data are input and decoded in the ADPCM 14 by the MCC & evacuating/writing circuit 91. The decoded recording voice data are input and converted to an analog audio signal in the D/A converter 15, and output through the audio output 20.

In case of necessity of evacuating/writing the recorded image/voice data in the flash memory 10, the MCC & evacuating/writing circuit 91 controls evacuating and writing the recorded image/voice data by DMA (Direct Memory Access) as a high-speed translation mode.

A route of evacuating the record image/voice data is from the flash memory card 10 to the MCC & evacuating/writing circuit 91, to the bus 18, to the camera processor 6, and to the memory 5. The memory 5 has the same capacity as the memory 5 of the prior art.

In order to perform a high-speed translation, the MCC & evacuating/writing circuit 91 automatically increments addresses which are supplied from the camera processor 6 to the memory 5, thereby to reduce the burden on the CPU 11.

In the flash memory card 10, file management data, for example a FAT (File Allocation Table), are stored as well as the recording image data or the recording voice data. The file management data need to be rewritten in 1 word blocks. After evacuating the file management data to the memory 5, the CPU 11 accesses the memory 5 by using the camera processor 6, and writes the evacuated file management data to the memory 5.

The MCC & evacuating/writing circuit 91 erases data in the flash memory card 10 by block units of the image/voice data or the file management data. After erasing data, the MCC & evacuating/writing circuit 91 re-records and routes the evacuated file data from the memory 5 to the flash memory card 10 via camera processor 6, the bus 18, the MCC & evacuating/writing circuit 91 and to the flash memory card 10.

Figure 2:
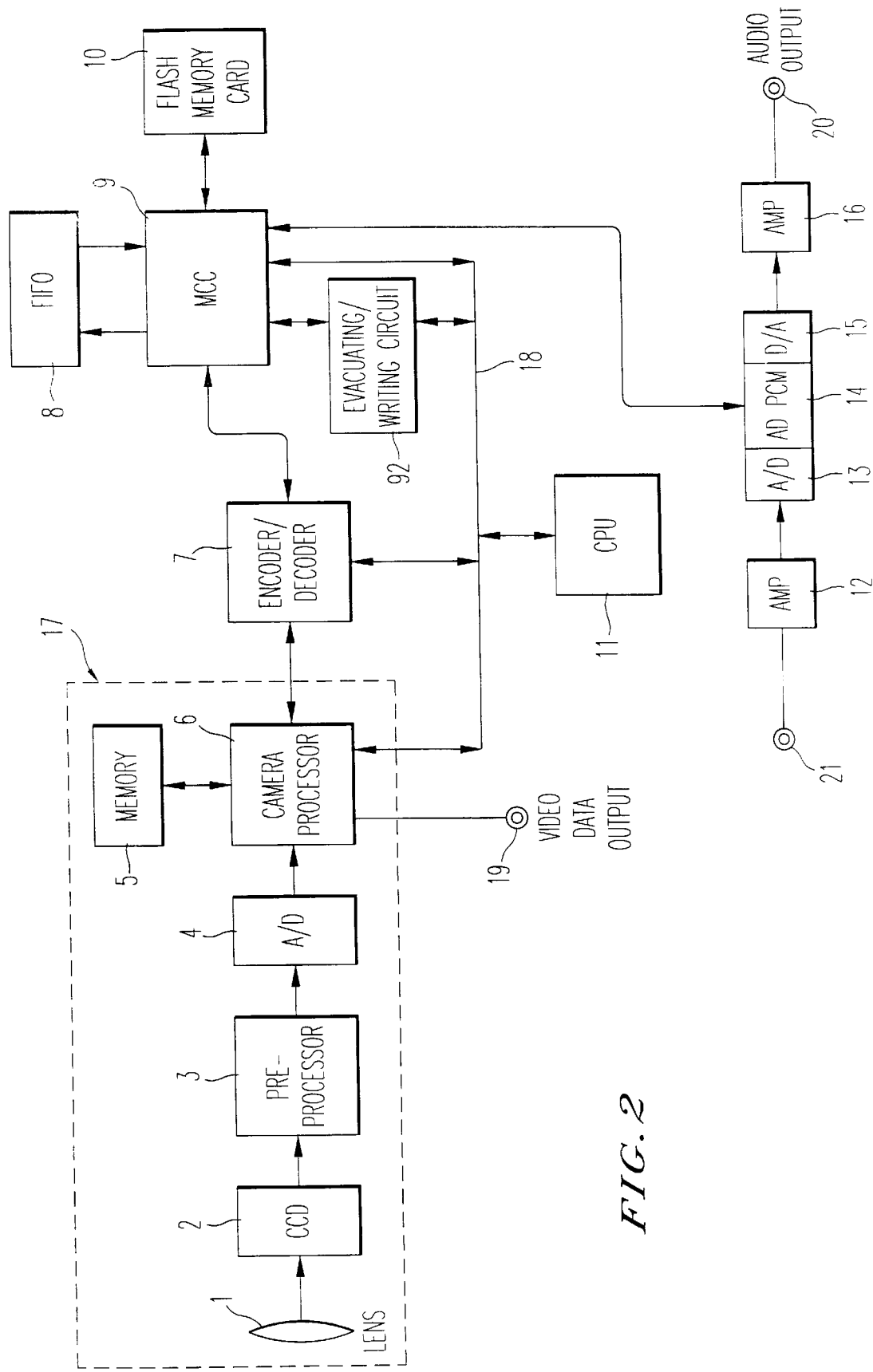
FIG. 2 is a block diagram of a digital still video camera of a second embodiment of the present invention.
Figure 3:
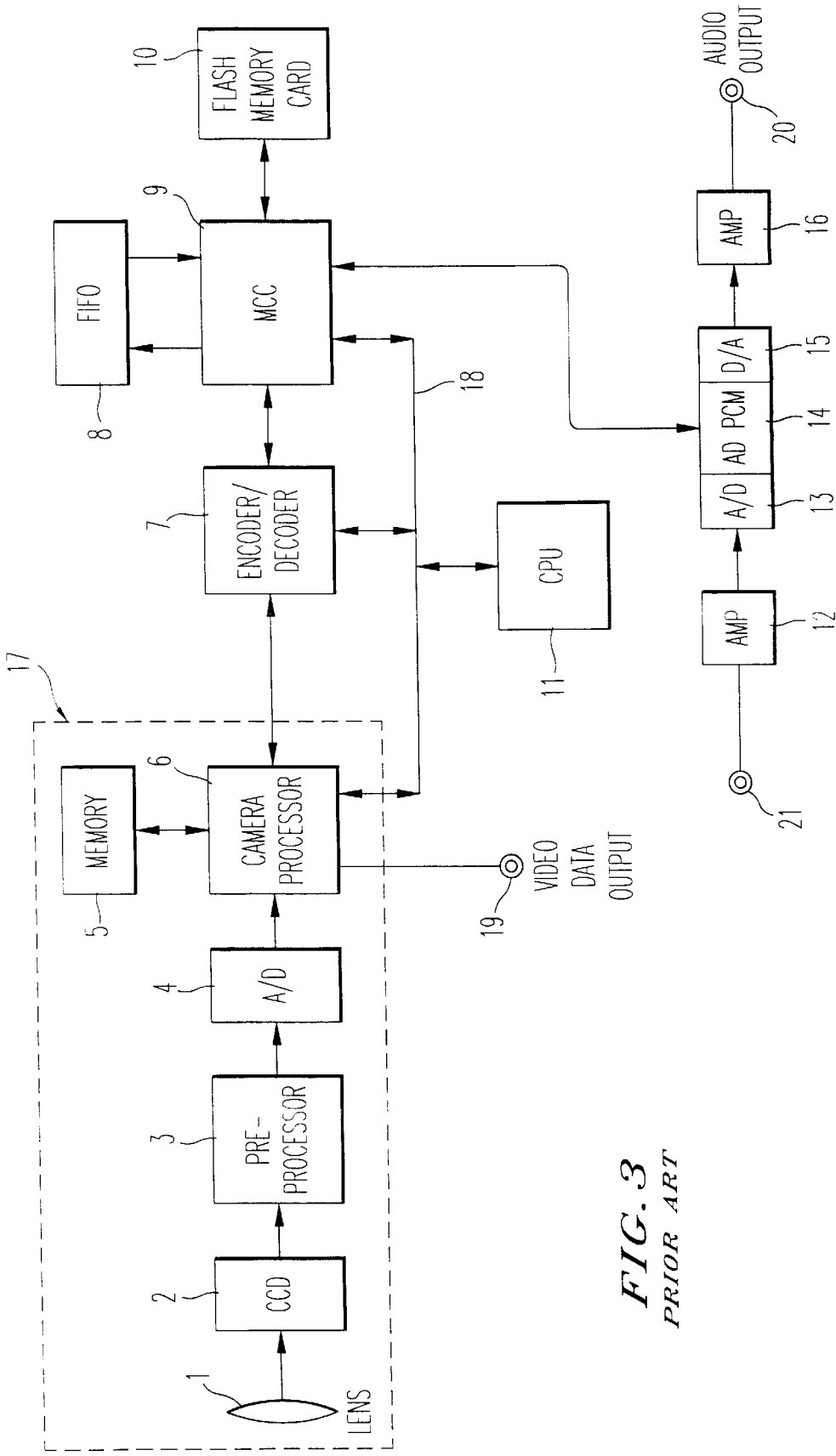
FIG. 3 is a block diagram of a digital still video camera of the prior art.

FIG. 2 is a block diagram of a digital still video camera of a second embodiment of the present invention. In FIG. 2, numeral 9 designates an MCC, and numeral 92 designates an evacuating/writing circuit. Compared with the first embodiment, the evacuating /writing circuit 92 is separate from the MCC 9. The evacuating/writing circuit 92 connects the MCC 9 to the bus 18. The other elements of the second embodiment in FIG. 2 perform the same function as the corresponding elements of the first embodiment shown in FIG. 1.

Obviously, numerous modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. A digital video still camera comprising:
   a camera processor which processes image data of a subject;
   a recording processor which generates recording data based on said image data which have been processed by said camera processor;
   a recording controller which controls recording of said recording data to a recording medium;
   a memory which stores said image data which have been processed by said camera processor;
   a control device which controls said camera processor, said recording processor, and said recording controller; and
   an evacuating/writing device which interrupts said control device when an evacuate/write operation is necessary and controls said camera processor and said recording controller to perform said evacuate/write operation wherein:
      said recording data which have been recorded in said recording medium are transferred to said memory,
      said recording medium is erased, and
      a portion of said recording data which has been transferred to said memory is transferred to said recording medium.

2. A digital still video camera according to claim 1, wherein said recording controller reads recorded recording data from said recording medium.

3. A digital still video camera according to claim 2, wherein said recording processor generates reproducing data based on recorded recording data read by said recording controller.

4. A digital still video camera according to claim 3, wherein said camera processor processes said reproducing data generated by said recording processor.

5. A digital still video camera according to claim 4, wherein said evacuating/writing device controls evacuating/writing of file managing data recorded in said recording medium.

6. A digital still video camera according to claim 5, wherein said control device controls rewriting recorded recording data to said memory after writing recording data to said memory by said evacuating/writing device.

7. A digital still video camera according to claim 5, wherein said control device controls addressing of said memory when rewriting recorded recording data to said memory.

8. A digital still video camera according to claim 5, wherein said evacuating/writing device increments addressing in every access to said memory when said recorded recording data are transferred to said memory.

9. A digital video camera according to any one of claims 1, 2, 3, 4, 5, 6, 7 and 8, wherein said evacuating/writing device controls evacuating/writing of said recorded recording data between said recording medium and said memory by direct memory accessing.

10. A digital still video camera comprising:
    a camera processor which processes image data of a subject;
    a recording processor which generates recording data based on said image data which has been processed by said camera processor;
    a memory which stores said image data which have been processed by said camera processor;
    a control device which controls said camera processor and said recording processor; and
    a recording controller which controls recording of said recording data to a recording medium,
    wherein
       said recording controller interrupts control of said camera processor and said recording processor by said control device when an evacuate/write operation is necessary, and controls said camera processor and said recording processor to perform said evacuate/write operation wherein
       said recording data which have been recorded in said recording medium are transferred to said memory,
       said recording medium is erased, and
       a portion of said recording data which has been transferred to said memory is transferred to said recording medium.

* * * * *